United States Patent
Nie et al.

(10) Patent No.: US 10,079,453 B2
(45) Date of Patent: Sep. 18, 2018

(54) ELECTRICAL TOOL WITH BATTERY PACK EJECTION ASSIST MECHANISM

(71) Applicant: Chervon (HK) Limited, Wanchai (HK)

(72) Inventors: Fangjie Nie, Nanjing (CN); Li Li, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 779 days.

(21) Appl. No.: 13/927,637

(22) Filed: Jun. 26, 2013

(65) Prior Publication Data
US 2014/0010585 A1    Jan. 9, 2014

(30) Foreign Application Priority Data

Jul. 5, 2012 (CN) .......................... 2012 1 0231000

(51) Int. Cl.
| | |
|---|---|
| *H01R 13/635* | (2006.01) |
| *B25F 5/00* | (2006.01) |
| *H01M 2/10* | (2006.01) |

(52) U.S. Cl.
CPC ............. *H01R 13/635* (2013.01); *B25F 5/00* (2013.01); *H01M 2/1022* (2013.01); *Y10T 403/1641* (2015.01)

(58) Field of Classification Search
CPC ...... H01R 13/635; H01M 2/1022; B25F 5/00; Y10T 403/1641
See application file for complete search history.

(56) References Cited

U.S. PATENT DOCUMENTS

| | | | |
|---|---|---|---|
| 4,580,182 A * | 4/1986 | Persiani ........... | G11B 15/67507 360/132 |
| 4,835,410 A * | 5/1989 | Bhagwat ................... | B25F 5/00 307/64 |
| 2003/0039880 A1* | 2/2003 | Turner ................ | H01M 2/1022 429/97 |

(Continued)

FOREIGN PATENT DOCUMENTS

| | | |
|---|---|---|
| CN | 201528005 | 7/2010 |
| JP | 2008117610 A * | 5/2008 |

OTHER PUBLICATIONS

Canadian Intellectual Property Office, Office Action and Examination Search Report issued on CA Appl. No. 2,819,958, dated Jan. 13, 2015, 4 pgs.

*Primary Examiner* — Thanh Truong
*Assistant Examiner* — Thomas Wittenschlaeger
(74) *Attorney, Agent, or Firm* — Greenberg Traurig, LLP

(57) ABSTRACT

The present invention provides an electrical tool with battery pack ejection assist mechanism. The electrical tool includes a housing receiving a motor and a transmission mechanism, a tool accessory driven by the motor for the operation, a battery pack slidably mounted to the housing for providing power and a locking mechanism for locking the battery pack after being mounted. The electrical tool further includes an ejecting assembly for assisting in the ejection of the battery pack when the locking mechanism unlocks the battery pack, the ejecting assembly includes a contacting member for contacting and ejecting the battery pack and a driving member for driving the contacting member for ejecting the battery pack. The contacting member is movably connected to the housing, and the driving member is arranged in the housing and contacts the contacting member.

2 Claims, 2 Drawing Sheets

(56) References Cited

U.S. PATENT DOCUMENTS

| | | | | |
|---|---|---|---|---|
| 2004/0235325 | A1* | 11/2004 | Iijima | G06K 7/0013 439/159 |
| 2005/0130034 | A1* | 6/2005 | Buck | H01M 2/1022 429/160 |
| 2006/0211289 | A1* | 9/2006 | Chen | H01R 13/6335 439/159 |
| 2008/0064239 | A1* | 3/2008 | Li | H01R 13/635 439/152 |
| 2008/0211327 | A1* | 9/2008 | Schlegel | B25F 5/02 310/50 |
| 2009/0015208 | A1* | 1/2009 | White | H01M 2/1022 320/150 |
| 2011/0116861 | A1 | 5/2011 | Zhang et al. | |

* cited by examiner

ELECTRICAL TOOL WITH BATTERY PACK EJECTION ASSIST MECHANISM

CROSS REFERENCE TO RELATED APPLICATION

This application is a non-provisional application claiming priority from Chinese Patent Application Serial No. 201210231000, filed Jul. 5, 2012, and incorporated herein by reference in its entirety.

FIELD OF THE DISCLOSURE

The present disclosure relates to an electrical tool powered by a battery pack, and more particular to an electrical tool with battery pack ejection assist mechanism.

BACKGROUND OF RELATED ART

With the advancement of the technology, more and more electrical tools utilize a battery pack as a power source. Because an electrical tool powered by a battery pack can get rid of the physical limitations of power cables, it is easier for the operator to use the tool in various workplaces. However, for high-power electrical tools, the equipped battery pack with high voltage and high capability has a relatively large size and weight. Because the weight of the battery pack and the elastic force between the battery pack and the connecting pole piece of the electrical tool are relatively large, it can be difficult and dangerous to pull out the battery pack directly by hand without assistance from an outside force when it is needed to remove the battery pack from the electrical tool.

Therefore, described herein is a mechanism arranged in the interior of the electrical tool to assist in the ejection of the battery pack from the electrical tool.

SUMMARY OF THE PRESENT DISCLOSURE

To overcome these and other shortcomings in the prior art, the present disclosure provides an electrical tool with a function of assisting in the ejection of a battery pack.

The present disclosure provides an electrical tool with a battery pack ejection assist mechanism. The electrical tool includes a housing receiving a motor and a transmission mechanism, a tool accessory driven by the motor, a battery pack slidably mounted to the housing for providing power and a locking mechanism for locking the battery pack after being mounted, and an ejecting assembly for assisting in the ejection of the battery pack when the locking mechanism unlocks the battery pack. The ejecting assembly includes a contacting member for contacting and ejecting the battery pack and a driving member capable of driving the contacting member and providing the assistance for ejecting the battery pack. The contacting member is movably connected to the housing, and the driving member is arranged in the housing and contacts the contacting member.

As an example, the driving member includes a first energy assembly for providing ejecting energy.

Furthermore, in another example, the first energy assembly is a helical spring with one end fixedly connected to the housing.

Furthermore, the helical spring may have an axis parallel to a sliding installation direction of the battery pack.

Furthermore, the contacting member may be an irregular-shaped lever with a pivoting shaft which has an axis substantially perpendicular to the axis of the helical spring and the sliding installation direction of the battery pack, and the irregular-shaped lever is rotatably connected to the housing.

Furthermore, the irregular-shaped lever may include one end connected to the other end of the helical spring and the other end formed with a projecting head for contacting and pushing out the battery pack.

As another example, the driving member further includes a first elastic block fixedly connected to the other end of the helical spring and having an inclined contacting surface.

Furthermore, the helical spring has an axis substantially perpendicular to a sliding installation direction of the battery pack.

Furthermore, the contacting member is a second elastic block having a contacting surface with an inclined angle which is the same as that of the contacting surface of the first elastic block.

Furthermore, the second elastic block is slidably connected to the housing and has a sliding direction parallel to the sliding installation direction of the battery pack.

Furthermore, the contacting surfaces of the first elastic block and the second elastic block have an acute angle of 45° relative to the sliding installation direction of the battery pack.

The electrical tool with a mechanism for assisting in the ejection of the battery pack enables the operator to remove the battery pack with a relatively small force so as to enhance the efficiency of exchanging the battery pack and avoid the risk of falling of the battery pack due to an excess force. In addition, the electrical tool with the assist mechanism may be relatively easy to operate and include a relatively simple structure for a prolonged working life.

DETAILED DESCRIPTION

The present disclosure will be described in details with reference to the drawings and the examples.

Figure 1:
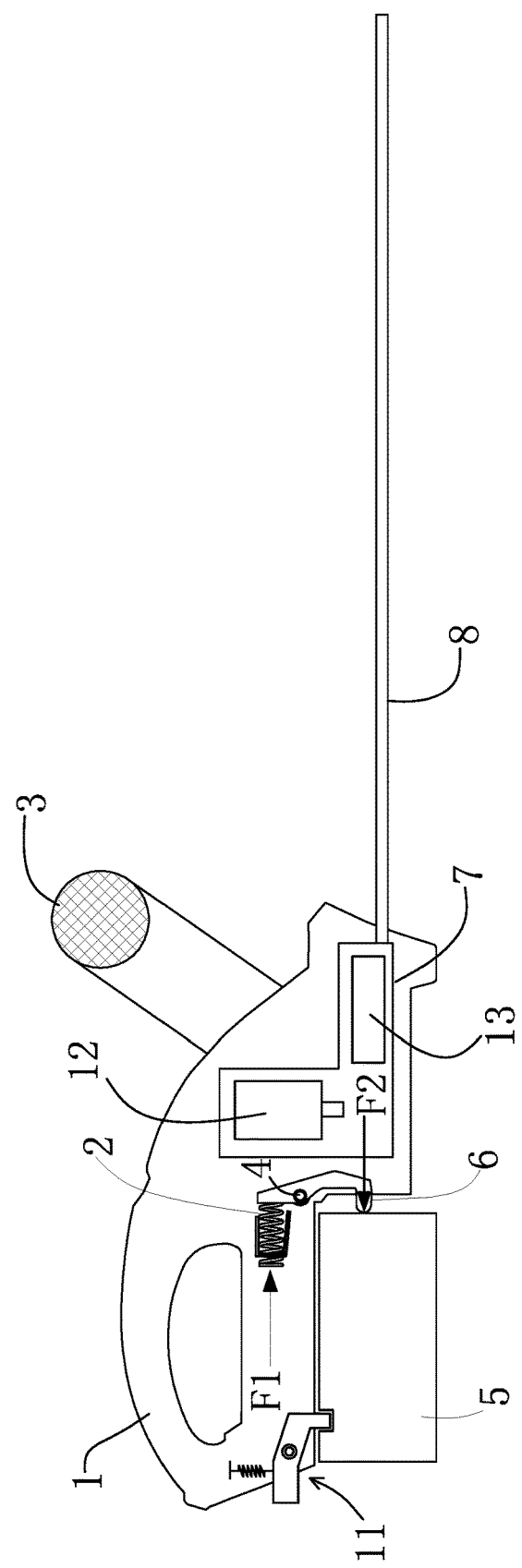
FIG. 1 is a schematic view showing a first example of the electrical tool with a battery pack ejection assist mechanism according to the present disclosure.
Figure 2:
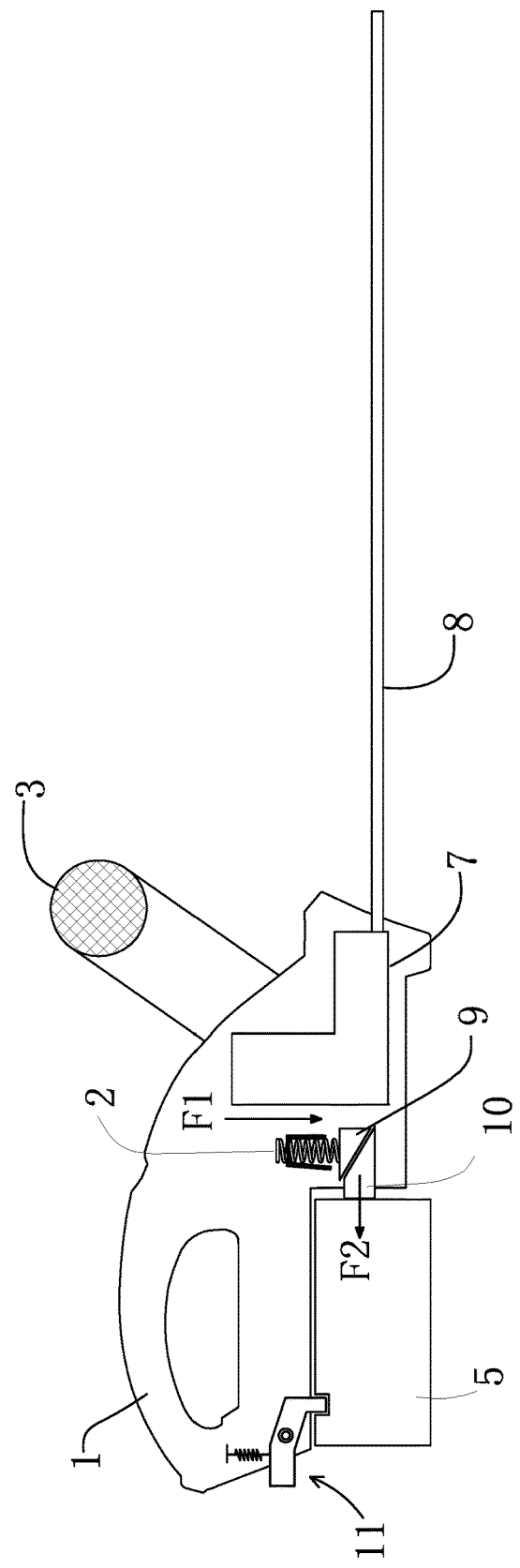
FIG. 2 is a schematic view showing a second example of the electrical tool with a battery pack ejection assist mechanism according to the present disclosure.

Referring to FIGS. 1-2, in a first example, an electrical tool with battery pack ejection assist mechanism of the present disclosure includes a housing 1 receiving a motor 12 and a transmission mechanism 13, a tool accessory driven by the motor 12 for the operation, a battery pack 5 slidably mounted to the housing for providing power and a locking mechanism 11 for locking the battery pack 5 after being mounted. Additionally, in order to assist in the ejection of the battery pack, the electrical tool further includes an ejecting assembly for assisting with ejecting the battery pack 5 when the locking mechanism 11 unlocks the battery pack 5.

The ejecting assembly includes a driving member 2 and a contacting member 6 for contacting and ejecting the battery pack 5. The driving member 2 is capable of driving the contacting member 6 and providing an assistive force for ejecting the battery pack. The contacting member 6 is movably connected to the housing 1, and the connection between the contacting member 6 and the housing may be a rotating connection, a sliding connection, or any other suitable connection as desired. The driving member 2 is arranged in the housing 1 and contacts the contacting member 6.

Specifically, the electrical tool may be a garden tool, such as hedge trimmer. The electrical tool includes a main handle (not labeled) formed on the housing 1 and a secondary handle 3 for assisting in the handling of the tool. The tool may further include a transmission device 7 for transmitting the power of the motor 12 and a cutting blade 8 as working accessory.

In one example, the driving member 2 includes a first energy assembly for providing ejecting energy. In the illustrated example, the first energy assembly is a helical spring with one end fixedly connected to the housing 1.

FIG. 1 shows a first example of the electrical tool with battery pack ejection assist mechanism according to the present disclosure. In this example, the helical spring has an axis parallel to a sliding installation direction of the battery pack 5. The contacting member 6 is an lever rotatably connected to the housing 1 by a pivoting shaft 4. The axis of the pivoting shaft 4 is perpendicular to the axis of the helical spring and the sliding installation direction of the battery pack 5. Additionally, one end of the lever is connected to the other end of the helical spring and the other end of the lever is formed with a projecting head (not labeled) for contacting and pushing out the battery pack 5. The helical spring connected between the housing 1 and the lever is in a compressed state, thus the helical spring is capable of providing a continuous first biasing force F1 to one end of the lever. When the locking mechanism 11 is unlocked, the first biasing force F1 provided by the helical spring is converted into a second biasing force F2 by lever, and transmitted to the battery pack 5 by the projecting head on the other end of the lever. Due to the leverage action, the second biasing force F2 may be larger than the first biasing force F 1. In this example the second biasing force F2 is sufficient to push and/or assist in pushing the battery pack 5 outwards a certain distance.

FIG. 2 shows a second example of the electrical tool with battery pack ejection assist mechanism according to the present disclosure. The electrical tool in the second example is similar in principle to the electrical tool in the first example. However, the driving member 2 in the second example further includes an elastic block 9 fixedly connected to the other end of the helical spring and having an inclined contacting surface. The axis of the helical spring is substantially perpendicular to the sliding installation direction of the battery pack 5. The contacting member in this example is a second elastic block 10 having a contacting surface with an inclined angle which is the same as that of the contacting surface of the first elastic block 9. The second elastic block is slidably connected to the housing 1 and the sliding direction of the second elastic block 10 is parallel to the sliding installation direction of the battery pack 5. Moreover, the connecting surfaces of the first elastic block 9 and the second elastic block 10 have an angle of 45° relative to the sliding installation direction of the battery pack 5.

When the helical spring connected between the housing 1 and the first elastic block 9 is in a compressed state, the helical spring can provide a continuous first biasing force F1 to the first elastic block 9. When the locking mechanism is unlocked, the first biasing force F1 exerted to the first elastic block 9 by the helical spring is converted into a second biasing force F2 by the inclined contacting surface, and transmitted to the battery pack 5 by the second elastic block 10. The second biasing force F2 can push and/or assist in pushing the battery pack 5 outwards a predetermined distance.

When the battery pack is removed from the electrical tool with the function of assisting in the ejection of the battery pack according to the present disclosure, the battery pack may be pushed outwards a certain distance by virtue of the ejecting assembly, thus the connecting effect between the battery pack and the electrical tool may be reduced and even eliminated. At that moment, the operator may remove the battery pack with a relatively small force. Thus, the risk of the battery pack falling due to an excess force of the operator is avoided and the efficiency of exchanging the battery pack is enhanced. Additionally, the ejecting assembly is arranged in the housing of the electrical tool, and it is easy to be operated and has a relatively simple structure and a good working life.

The above description shows and illuminates the basic principle, main features and advantages of the present disclosure. It may be appreciated by a person of ordinary skill in the art that the above examples are not intended to limit the present disclosure in any forms, and the technical solutions obtained by equivalent replacement or equivalent modification are contained in the protection scope of the present disclosure.

We claim:

1. An electrical tool with battery pack ejection assist mechanism, comprising:
   a housing receiving a motor and a transmission mechanism operably coupled to the motor;
   a tool accessory driven by the transmission mechanism;
   a battery pack slidably mounted to the housing, the battery pack and housing comprising cooperative electrical terminals to electrically couple the battery pack to the motor for providing power to the motor; and
   an ejecting assembly for assisting in the ejection of the battery pack from the housing, the ejecting assembly comprising a contacting member for contacting and ejecting the battery pack and a driving member for driving the contacting member to eject the battery pack, the contacting member being movably connected to the housing, and the driving member being arranged in the housing and contacting the contacting member,
   a locking mechanism for locking the battery pack on the housing,
   wherein the driving member comprises a helical spring with one end fixedly connected to the housing,
   wherein the contacting member is a lever pivotably coupled to the housing about a pivot shaft mounted outside the perimeter of the battery pack and between the driving member and the contact member, the pivot shaft having an axis at least one of perpendicular or substantially perpendicular to the axis of the helical spring and the sliding installation direction of the battery pack,
   wherein the lever comprises a first end connected to a corresponding end of the helical spring and a second end formed with a projecting head for contacting and ejecting the battery pack, and wherein the projecting head is at least partially disposed outside the housing,
   wherein when the battery pack is locked on the housing by the locking mechanism, the helical spring is always compressed between the housing and the lever and is capable of providing a continuous first biasing force to one end of the lever,
   wherein when the locking mechanism unlocks the battery pack, the first biasing force provided by the helical spring is converted into a second biasing force by the lever and transmitted to the battery pack by the projecting head on the other end of the lever, and wherein the second biasing force is larger than the first biasing force.

2. The electrical tool with battery pack ejection assist mechanism according to claim 1, wherein the helical spring has an axis parallel to a sliding installation direction of the battery pack.

\* \* \* \* \*

UNITED STATES PATENT AND TRADEMARK OFFICE
CERTIFICATE OF CORRECTION

PATENT NO. : 10,079,453 B2  
APPLICATION NO. : 13/927637  
DATED : September 18, 2018  
INVENTOR(S) : Fangjie Nie and Li Li Page 1 of 1

It is certified that error appears in the above-identified patent and that said Letters Patent is hereby corrected as shown below:

On the Title Page

(73) Assignee: 'Chevron' (HK) Limited should read --Chervon-- (HK) Limited

Signed and Sealed this  
Thirteenth Day of November, 2018

Andrei Iancu  
*Director of the United States Patent and Trademark Office*